US006921077B1

(12) United States Patent
Pupo

(10) Patent No.: US 6,921,077 B1
(45) Date of Patent: Jul. 26, 2005

(54) ROOF TOP FOR VEHICLES

(76) Inventor: Oscar Pupo, 20830 Coral Sea Rd., Miami, FL (US) 33189

( * ) Notice: Subject to any disclaimer, the term of this patent is extended or adjusted under 35 U.S.C. 154(b) by 0 days.

(21) Appl. No.: 10/633,476

(22) Filed: Aug. 4, 2003

(51) Int. Cl.[7] ............................ B60J 7/00; B60J 7/185
(52) U.S. Cl. ................................................ 276/102
(58) Field of Search .............................. 296/102, 103, 296/210, 216, 214, 218, 216.01

(56) References Cited

U.S. PATENT DOCUMENTS

| | | | | |
|---|---|---|---|---|
| 1,819,545 | A * | 8/1931 | Delp ...................... | 296/107.08 |
| 4,238,876 | A * | 12/1980 | Monroe et al. ............ | 29/401.1 |
| 4,679,847 | A * | 7/1987 | Dirck ........................ | 296/218 |
| 4,805,956 | A * | 2/1989 | Saunders ................ | 296/107.17 |
| 4,950,022 | A * | 8/1990 | Pattee .................... | 296/107.17 |
| 4,978,161 | A * | 12/1990 | Schulze ................... | 296/180.1 |
| 5,056,857 | A * | 10/1991 | Ney et al. ................. | 296/107.2 |
| 5,106,150 | A * | 4/1992 | Litwicki ................ | 296/216.02 |
| 5,205,607 | A * | 4/1993 | Takeuchi .................... | 296/201 |
| 5,286,081 | A * | 2/1994 | Martin, Jr. ............. | 296/190.08 |
| 5,906,408 | A * | 5/1999 | Cooper ........................ | 296/114 |
| 6,283,531 | B1 * | 9/2001 | Tanigawa et al. ........... | 296/103 |
| 6,309,007 | B1 * | 10/2001 | Essig et al. ................. | 296/103 |
| 6,457,768 | B1 * | 10/2002 | Schroeder et al. .......... | 296/214 |
| 2004/0130188 | A1 * | 7/2004 | Stevens et al. ............. | 296/218 |

FOREIGN PATENT DOCUMENTS

| | | | | |
|---|---|---|---|---|
| GB | 2099377 A | * | 12/1982 | .................. 296/102 |
| GB | 2176155 A | * | 12/1986 | .................. 296/102 |
| JP | 363176716 A | * | 7/1988 | .................. 296/218 |

* cited by examiner

*Primary Examiner*—H. Gutman
(74) *Attorney, Agent, or Firm*—Albert Bordas; Jesus Sanchelima

(57) ABSTRACT

A removable rooftop for jeep-type vehicles is provided. The rooftop comprises a top wall. Extending approximately perpendicularly from the top wall are first and second side walls. The rooftop is removable and is of a half-cut design. The rooftop is a hard top and is lightweight, allowing a single person to mount or remove the rooftop from the jeep-type vehicle. Additionally, the rooftop comprises a support wall integrated onto the top wall to allow for a sunroof to be installed into the rooftop if desired.

1 Claim, 5 Drawing Sheets

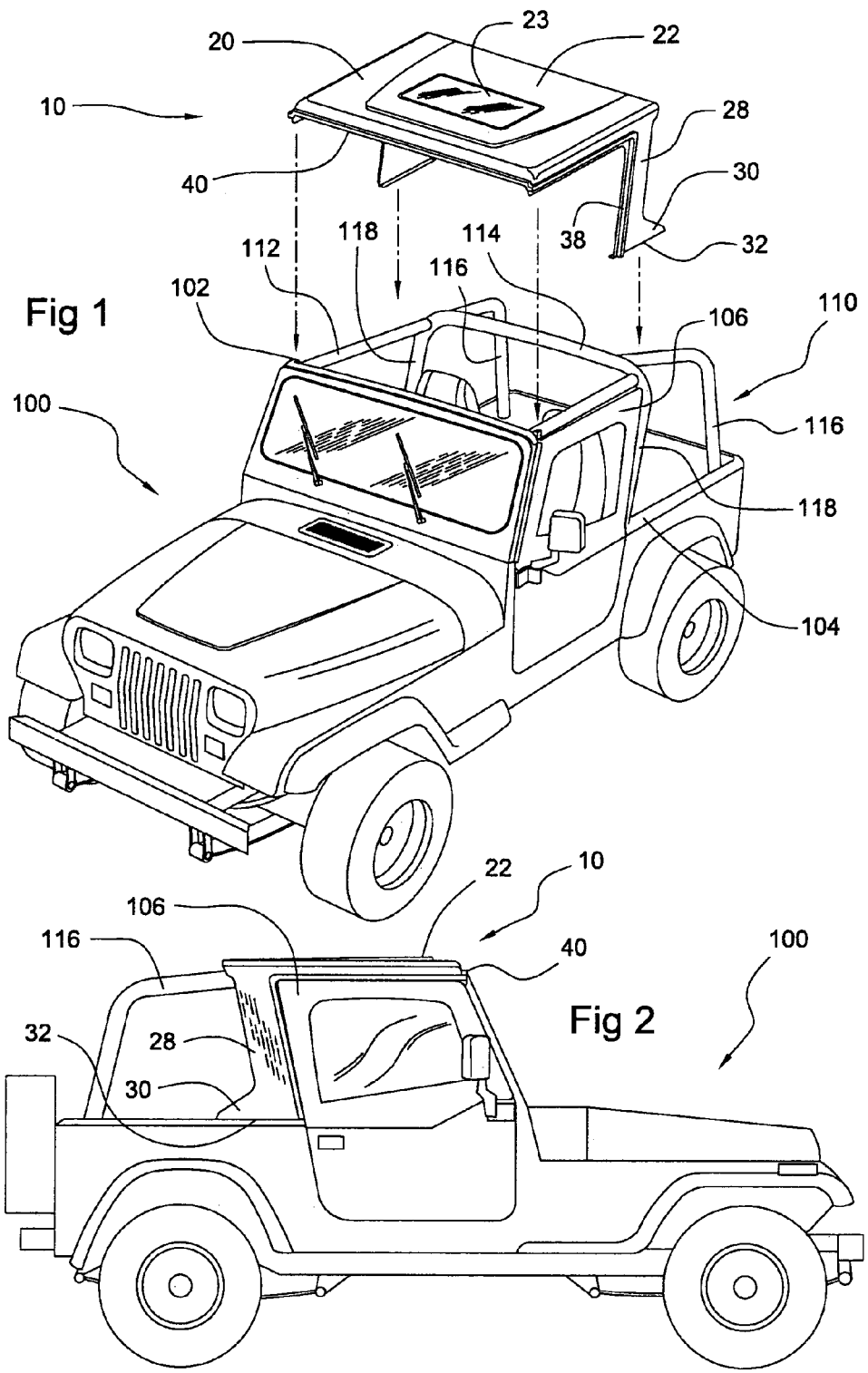

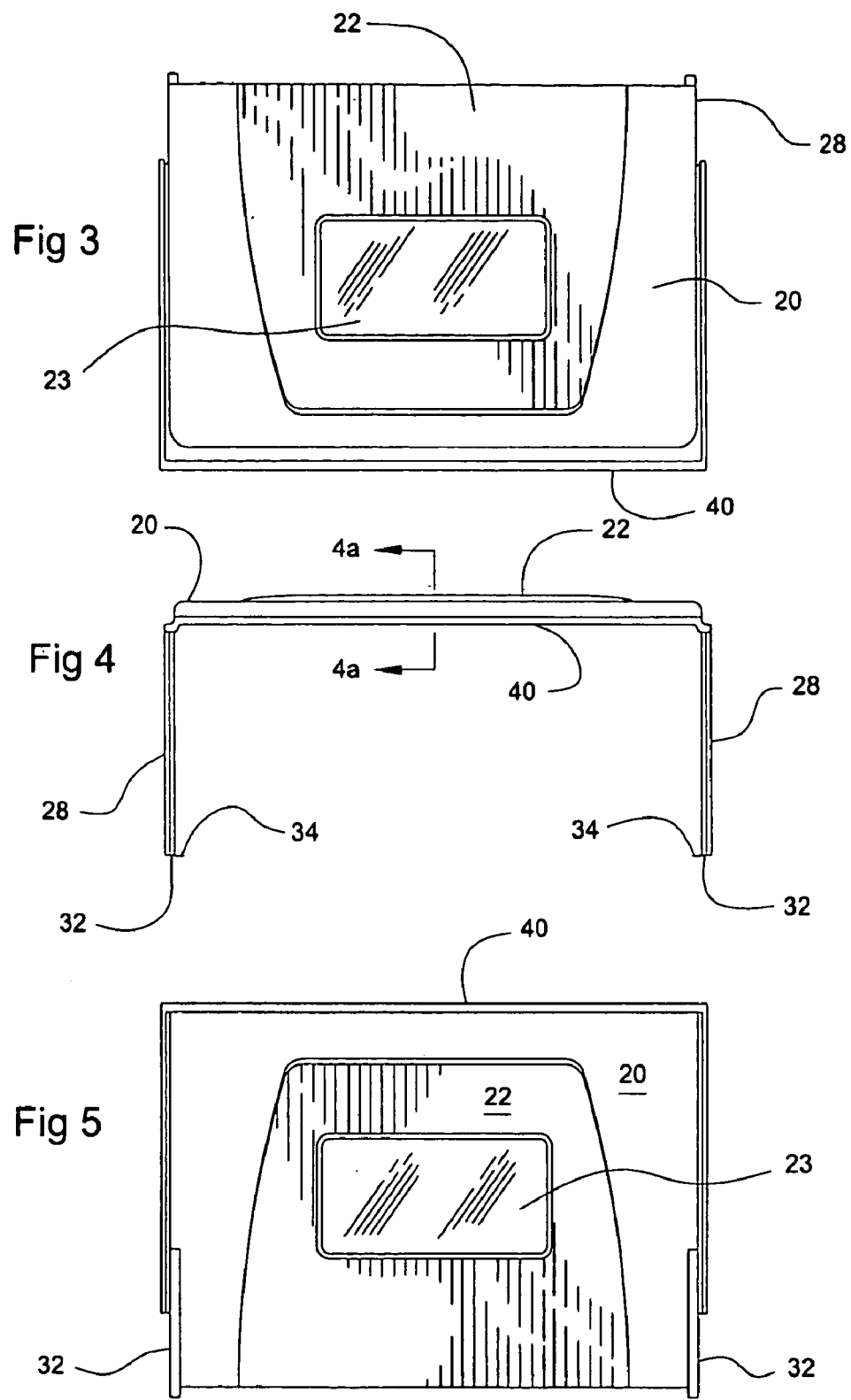

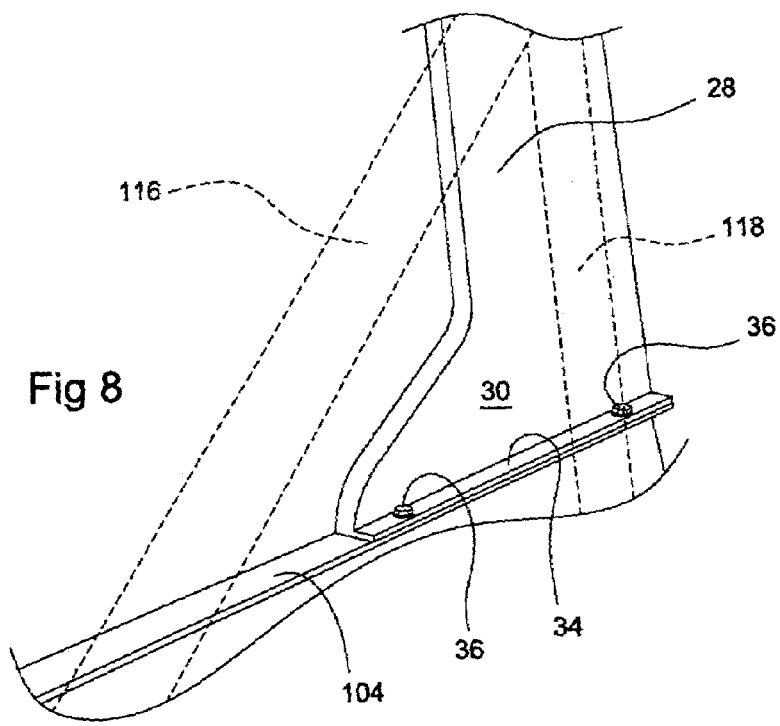
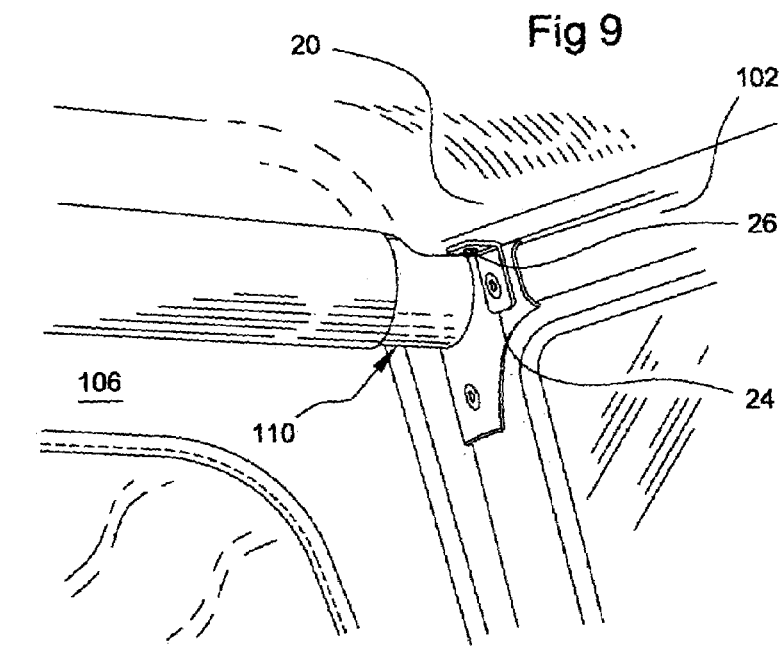

ROOF TOP FOR VEHICLES

BACKGROUND OF THE INVENTION

1. Field of the Invention

The present invention relates to vehicle rooftops, and more particularly, to removable rooftops for jeep-type vehicles.

2. Description of the Related Art

Many designs for rooftops of jeep-type vehicles have been designed in the past. Some of these designs have included bikini-type soft tops and full hard tops. None of them, however, includes the characteristics brought forth in the instant invention, namely a removable, half cut, hard rooftop for jeep-type vehicles. The instant invention is lightweight, allowing a single person to mount or remove the rooftop. Additionally, the rooftop comprises a support wall to allow for a sunroof to be installed into the rooftop if desired.

There are no rooftops for jeep-type vehicles to the best of applicant's knowledge that are lightweight, removable, half cut, and hard for jeep-type vehicles that also allow for the installation of a sunroof.

SUMMARY OF THE INVENTION

A rooftop used in combination with jeep-type vehicles, comprises a substantially rectangular top wall having first, second, third, and fourth ends. The first and second ends are parallel and equally spaced apart from each other by the third and fourth ends. The first end is removably secured to a windshield frame of a jeep-type vehicle. The substantially rectangular top wall also has first and second elongated wedges.

First and second side walls extend substantially perpendicularly from the third and fourth ends to form a rooftop for the jeep-type vehicle. The first and second side walls terminate at first and second bases respectfully and mount upon the jeep-type vehicle. The rooftop forms a driver and front passenger cabin for the jeep-type vehicle.

The first and second elongated wedges extend from the first end to the first and second bases. The first and second elongated wedges have cooperative characteristics to receive door window frames of the jeep-type vehicle when the door window frames are in a closed position, with the jeep doors closed.

The substantially rectangular top wall has a reinforced area defined as a support wall for structural integrity and the substantially rectangular top wall has a sunroof assembly built within the support wall. The sunroof assembly is at a first predetermined distance from the first end and extends towards the second end without reaching the second end.

The rooftop is filled with a filler material to reduce ultra violet radiation and reduce exterior noise within the driver and front passenger cabin of the jeep-type vehicle.

The rooftop is made of a hard, lightweight, weatherproof plastic material.

It is therefore one of the main objects of the present invention to provide a removable rooftop that is half cut and is structurally designed to allow for the installation of a sunroof.

It is another object of this invention to provide a hard removable rooftop that may be installed onto a jeep-type vehicle, without making modifications to the jeep-type vehicle.

It is another object of the present invention to provide a removable rooftop that is a hard type top.

It is another object of the present invention to provide a removable rooftop that is lightweight and may be mounted onto a jeep-type vehicle without aid or assistance.

It is still another object of the present invention to provide a removable rooftop that reduces interior cabin noise for the driver and passengers.

It is yet another object of the present invention to provide a removable rooftop that provides protection from weather elements such as wind, rain, hail, sleet, and snow.

It is still another object of the present invention to provide a removable rooftop that provides protection from UV radiation.

It is yet another object of the present invention to provide a removable rooftop that protects the driver and passengers from debris while driving.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a perspective view of the instant invention over a jeep-type vehicle.

FIG. 2 shows a side view of the instant invention mounted onto the jeep-type vehicle.

FIG. 3 illustrates a top view of the instant invention.

FIG. 4 is a representation of a front view of the instant invention.

FIG. 5 illustrates a bottom view of the instant invention.

FIG. 8 shows a close up view of the interior side of a side wall and leg bolted to the base of the jeep-type vehicle.

FIG. 9 shows a corner of the interior side of the top wall secured onto ridge 102.

DETAILED DESCRIPTION OF THE PREFERRED EMBODIMENT

Figure 4A:
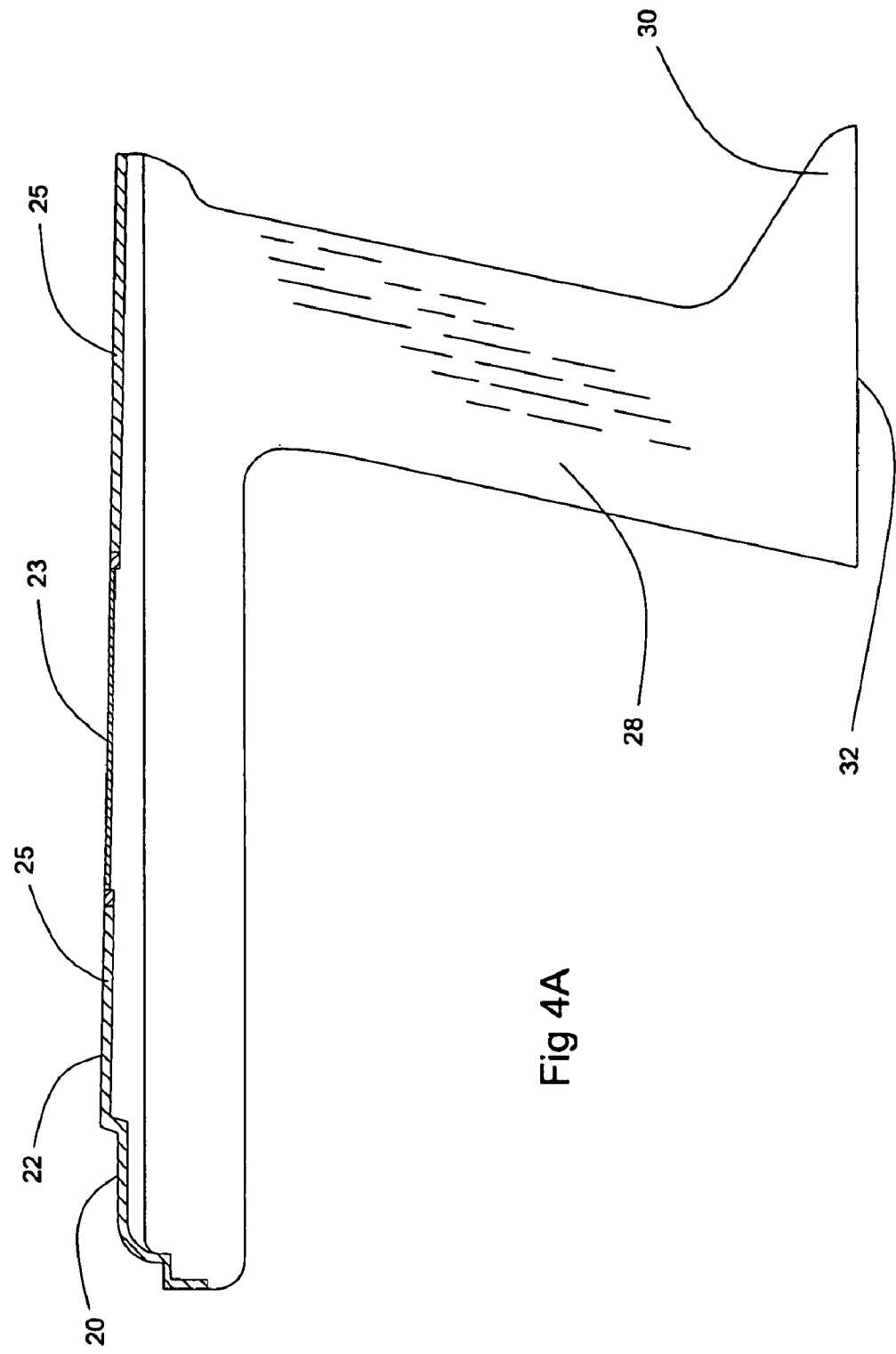
FIG. 4a is a cut view of the instant invention taken along the line 4a–4a as seen in FIG. 4 showing the filler material.

Referring now to the drawings, where the present invention is generally referred to with numeral 10, it can be observed that it basically includes top wall 20 and side walls 28.

As seen in FIG. 1, instant invention 10 is in position to be mounted onto jeep-type vehicle 100. Instant invention 10 comprises top wall 20. Top wall 20 has support wall 22. In the preferred embodiment, support wall 22 is sturdy and of thickness to have sunroof assembly 23 mounted within. Sunroof assembly may be centrally positioned over the driver and front passenger side of jeep-type vehicle 100. Extending approximately perpendicularly from top wall 20, are side walls 28. Each respective side wall 28 terminates at its base 32 of leg 30. Leg 30 is shaped to fit flush against base 104 of jeep-type vehicle 100 when mounted upon it. Extending from front edge 40 of top wall 20 to base 32 of leg 30 is wedge 38. Wedge 38 is shaped to complement the shape of door 106 when door 106 is shut closed, as seen in FIG. 2. In the closed position, the door window frame of door 106, forms a seal with wedge 38. This seal reduces interior cabin noise for the driver and passengers; provides protection from weather elements such as wind, rain, hail, sleet, and snow; and helps protect the driver and passengers from debris while driving.

Jeep-type vehicle 100 comprises ridge 102 of a windshield assembly, doors 106, and base 104. Typically mounted onto jeep-type vehicle 100 is roll bar assembly 110. Roll bar assembly 110 comprises sidebars 112 parallel and equally spaced apart from each other by support bar 114 and ridge 102. Support bar 114 extends generally perpendicularly defining mid bars 118. Further stabilizing roll bar assembly 110 onto jeep-type vehicle 100, are rear bars 116, which mount directly thereon.

Seen in FIG. 2 is a side view of instant invention 10 mounted onto jeep-type vehicle 100. Instant invention 10 is designed to fit onto jeep-type vehicle 100 without making modifications to jeep-type vehicle 100. Meaning, instant invention 10 may be installed onto a jeep-type vehicle as the vehicle is delivered from its factory. Once mounted and secured onto jeep-type vehicle 100, instant invention 10 is strong, stable and sturdy, essentially a part of the jeep-type vehicle. Front edge 40 secures onto ridge 102, seen in FIG. 1, and base 32 secures onto base 104 of jeep-type vehicle 100. In the preferred embodiment, jeep-type vehicle 100 is a "JEEP" model "CJ-7", or WRANGLER" up to the year 1998 of DaimlerChrysler. More specifically, the jeep-type vehicle is a vehicle suitable for traveling over rough terrain having four wheels and exhibiting the characteristics or capable of exhibiting the characteristics of a jeep.

As seen in FIGS. 3 and 5, instant invention 10 comprises sunroof assembly 23, which is built into support wall 22 in the preferred embodiment. As part of top wall 20, support wall 22 is structurally designed with additional layering to allow for the installation of sunroof assembly 23, without compromising the necessary rigid qualities of a rooftop.

As seen in FIG. 4, support wall 22 defines a thicker section of top wall 20 for sufficient room of sunroof assembly 23, seen in FIG. 3. Extending approximately perpendicularly from top wall 20 are side walls 28. Side walls 28 terminate at bases 32. Each base 32 comprises a flange 34.

Figure 6:
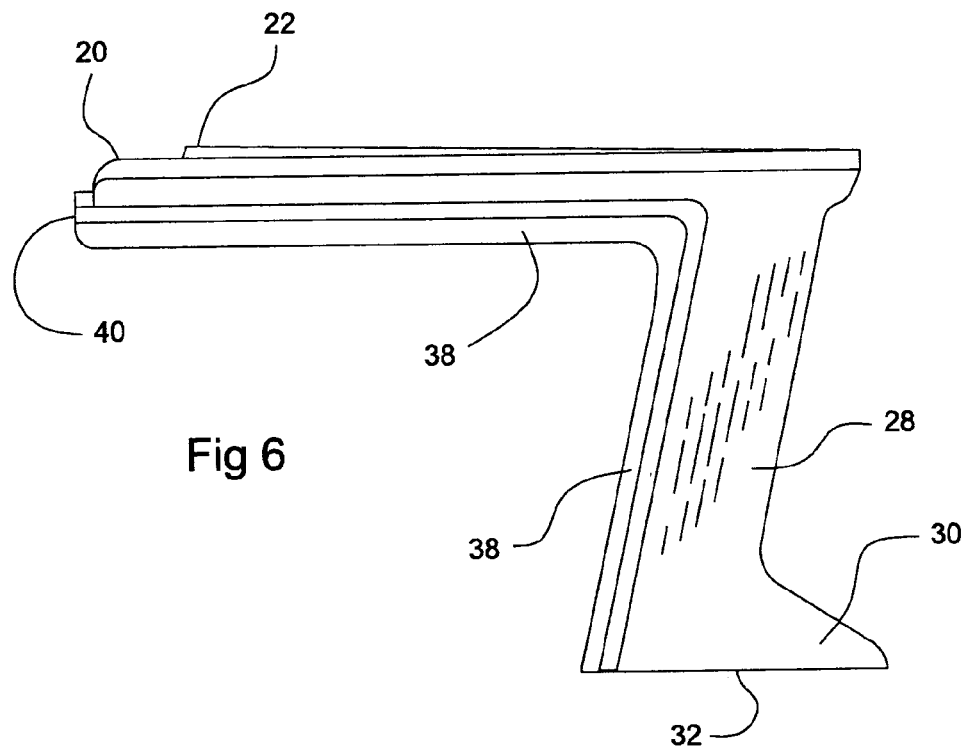
FIG. 6 shows a side view of the instant invention.
Figure 7:
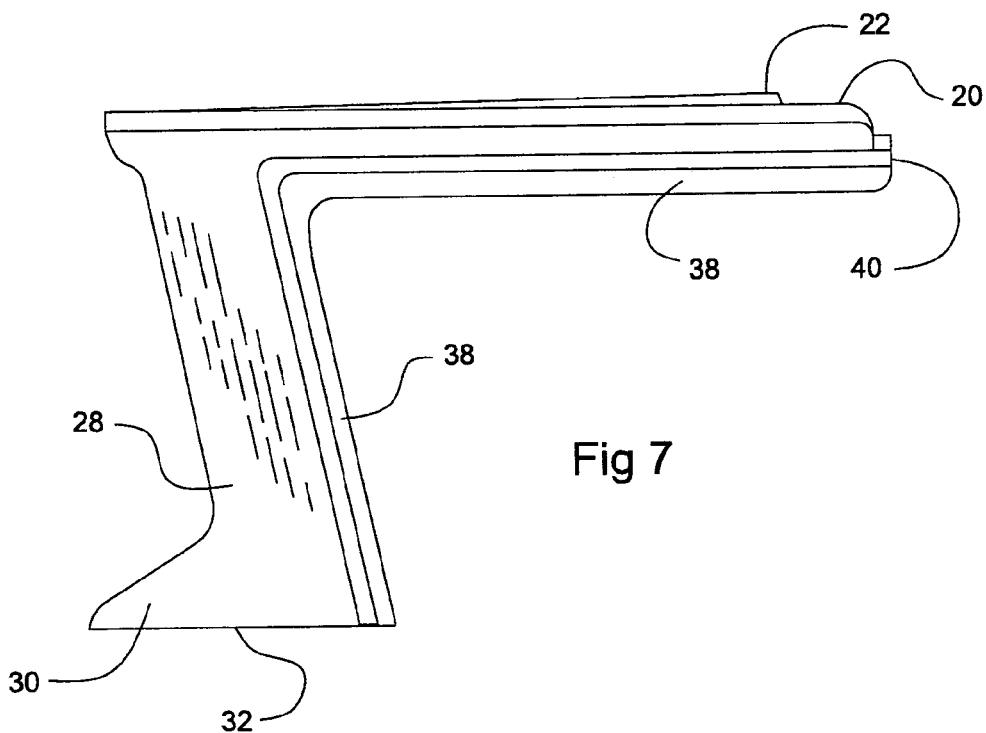
FIG. 7 shows another side view of the instant invention.

As seen in FIGS. 6 and 7, wedges 38 are shaped to complement the shape of door 106 when door 106 is shut closed, as seen in FIG. 2.

As seen in FIG. 8, side wall 28 and leg 30 mount on the exterior side of rear bar 116 and mid bar 118, enabling flange 34 to mount flush onto base 104. In the preferred embodiment, bolts 36 may be utilized to secure flange 34. Bolts 36 may be replaced with other forms of attachment, including but not limited to, rivets, welding, screws, and quick-release fasteners.

As seen in FIG. 9, bracket 24, extending from the interior side of top wall 20 may be used to secure instant invention 10 to ridge 102. In the preferred embodiment, bolts 26 may be utilized to secure bracket 24. Bolts 26 may be replaced with other forms of attachment, including but not limited to, rivets, welding, screws, and quick-release fasteners.

In the preferred embodiment, instant invention 10 may be manufactured from hard weatherproof plastic materials that are lightweight yet strong. Various plastic polymers and composites may be utilized for manufacturing purposes. The plastic materials are strong enough to provide protection from weather elements such as wind, rain, hail, sleet, and snow as an example. In addition, the plastic materials are strong enough to provide protection for the driver and passengers from debris while driving.

The instant invention, defined as a removable rooftop, is lightweight and may be mounted onto jeep-type vehicle 100 by a single person without aid or assistance in most cases. Furthermore, the removable rooftop may be installed onto a jeep-type vehicle without making modifications to the jeep-type vehicle.

In between the exterior and interior walls of top wall 20, support wall 22, side walls 28, and legs 30, instant invention 10 may comprise foam 25, seen in FIG. 4a, or other filler material to strengthen instant invention 10. In the preferred embodiment, the foam or filler material provides protection from UV radiation and reduces interior cabin noise for the driver and passengers.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A vehicle with a detachable rooftop, comprising:
    A) a front driver door and a front passenger door, said front driver door and said front passenger door each having door window frames, each of said door window frames framing a door window, said front driver door and said front passenger door mounted onto the vehicle suitable for traveling over rough terrain having four wheels and exhibiting the characteristics or capable of exhibiting the characteristics of a jeep, said door window frames parallel with respect to each other and each having a framed mirror mounted thereon;
    B) a mounting assembly including a windshield frame assembly framing a windshield, said windshield frame assembly mounted onto said vehicle, said mounting assembly further comprising a roll bar, said roll bar comprising first and second sidebars, said first sidebar parallel to said front driver door and said second sidebar parallel to said front passenger door, said roll bar secured at said first and second sidebars to said windshield frame assembly, said mounting assembly further comprising first and second flat horizontal base walls perpendicularly disposed to said windshield frame assembly;
    C) a substantially rectangular top wall having first, second, third, and fourth ends, said first and second ends parallel and equally spaced apart from each other by said third and fourth ends, said first end removably secured to said windshield frame assembly of said vehicle, said substantially rectangular top wall also having first and second elongated wedges, first and second side walls extend substantially perpendicularly from said third and fourth ends to form a detachable rooftop for said vehicle, said first and second side walls terminating at first and second bases respectfully and mount upon said first and second flat horizontal base walls of said vehicle, said detachable rooftop only covering a driver and front passenger cabin of said vehicle, further characterized in that said first and second elongated wedges extend from said first end to said first and second bases, said first and second elongated wedges having cooperative characteristics to receive said door window frames of said front driver door and the front passenger door when said door window frames are in a closed position, said substantially rectangular top wall has a reinforced area defined as a support wall for structural integrity, said substantially rectangular top wall has a sunroof assembly built within said support wall, said sunroof assembly at a first predetermined distance from said first end extending towards said second end without reaching said second end, said detachable rooftop is filled with a filler material to reduce ultra violet radiation and reduce exterior noise within said driver and front passenger cabin of said vehicle, said detachable rooftop is made of a hard, lightweight, weatherproof plastic material and having cooperative characteristics to be mounted onto said vehicle; and D) fastening means comprising at least one flange, said at least one flange securing said first end to said windshield frame assembly of said vehicle with first bolts, said fastening means also comprises second bolts bolting said first and second bases to said first and second flat horizontal base walls of said vehicle.

* * * * *